US005549323A

United States Patent [19]

Davis

[11] Patent Number: 5,549,323
[45] Date of Patent: Aug. 27, 1996

[54] PLASTIC AIR BAG COVER HAVING AN INTEGRATED OCCUPANT-SENSING SENSOR MODULE

[75] Inventor: David J. Davis, Troy, Mich.

[73] Assignee: Larry J. Winget, Leonard, Mich.

[21] Appl. No.: 477,872

[22] Filed: Jun. 7, 1995

[51] Int. Cl.⁶ .................. B60R 21/20; B60R 21/32
[52] U.S. Cl. .............. 280/728.3; 280/732; 280/735
[58] Field of Search ................... 280/735, 734, 280/728.1, 728.3, 731, 732, 730.1, 730.2; 180/272, 273; 340/436, 438; 362/80, 83.3, 812; 40/593, 544, 564

[56] References Cited

U.S. PATENT DOCUMENTS

| 4,834,420 | 5/1989 | Sankrithi et al. | 280/728.1 |
|---|---|---|---|
| 5,062,661 | 11/1991 | Winget | 280/731 |
| 5,071,160 | 12/1991 | White et al. | 280/735 |
| 5,074,583 | 12/1991 | Fujita et al. | 280/735 |
| 5,118,134 | 6/1992 | Mattes et al. | 280/735 |
| 5,232,243 | 8/1993 | Blackburn et al. | 280/735 |
| 5,330,226 | 7/1994 | Gentry et al. | 280/735 |
| 5,366,241 | 11/1994 | Kithil | 280/735 |
| 5,398,185 | 3/1995 | Omura | 280/735 |
| 5,400,487 | 3/1995 | Gioutsos et al. | 280/735 |
| 5,413,378 | 5/1995 | Steffens, Jr. et al. | 280/735 |
| 5,439,249 | 8/1995 | Steffens, Jr. et al. | 280/735 |
| 5,446,661 | 8/1995 | Gioutsos et al. | 280/735 |
| 5,454,591 | 10/1995 | Mazur et al. | 280/735 |

FOREIGN PATENT DOCUMENTS

| 3802159 | 8/1989 | Germany | 280/735 |
|---|---|---|---|
| 4023109 | 1/1992 | Germany | 280/734 |
| 94/22693 | 10/1994 | WIPO | 280/735 |

*Primary Examiner*—Kevin Hurley
*Assistant Examiner*—Peter C. English
*Attorney, Agent, or Firm*—Brooks & Kushman P.C.

[57] ABSTRACT

A plastic air bag cover is provided having an integrated occupant-sensing sensor module adapted for use in a vehicle occupant-sensing system. The sensor module includes a base plate and either a single occupant-sensing sensor (i.e., a transceiver) or a sensor pair (a transmitter and a separate receiver) mounted on the base plate. The sensor module receives a first signal which is transmitted through a window in the front panel of the air bag cover. In one embodiment, the window is formed adjacent the front panel. In turn, the sensor generates a second signal for use by the occupant-sensing system to prevent the air bag from being deployed.

9 Claims, 3 Drawing Sheets

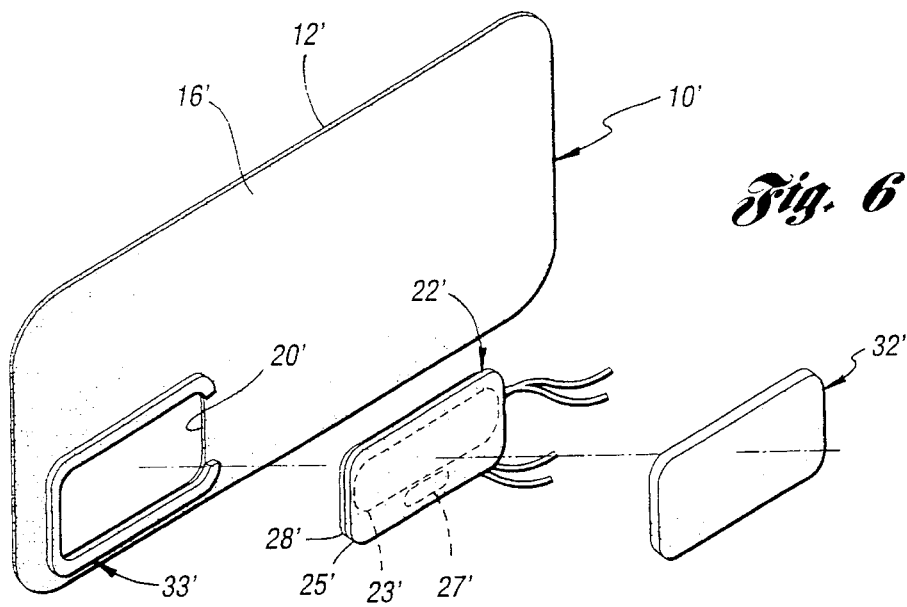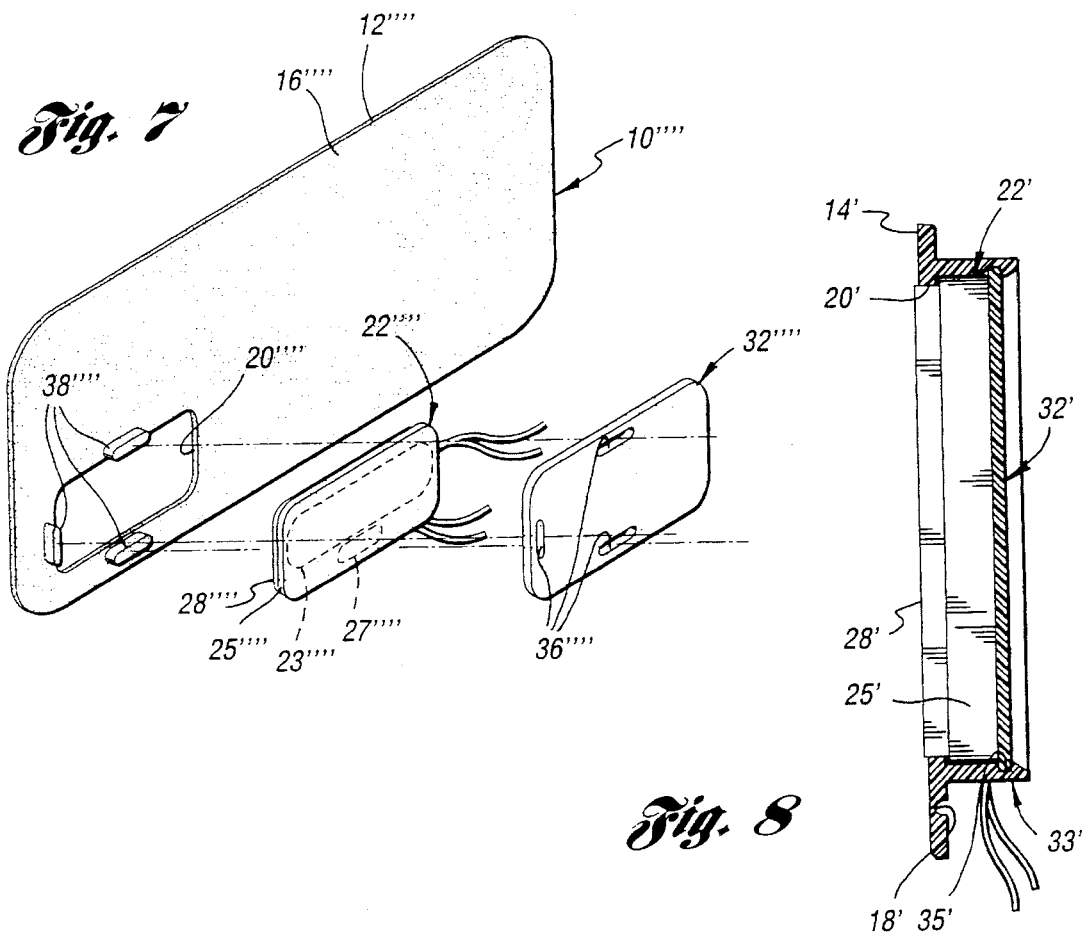

PLASTIC AIR BAG COVER HAVING AN INTEGRATED OCCUPANT-SENSING SENSOR MODULE

CROSS-REFERENCE TO RELATED APPLICATIONS

This invention is related to U.S. patent application Ser. No. 08/407,925, filed Mar. 21, 1995, entitled "Air Bag Cover Having A Switch Assembly Disposed Therein". This invention is also related to U.S. patent application Ser. No. 08/458,882, filed Jun. 2, 1995 entitled "Thermoplastic Air Bag Cover Having A Membrane Switch". This invention further relates to U.S. patent application Ser. No. 08/451,458, filed May 26, 1995, entitled "Thermoplastic Air Bag Cover Having A Domed Front Panel And Unitary Multi-functional Switching Module" and U.S. patent application Ser. No. 08/477,873, filed Jun. 7, 1995, entitled "Plastic Air Bag Cover Having An Integrated Light Source".

TECHNICAL FIELD

This invention relates to plastic air bag covers having sensors therein and in particular to plastic air bag covers having sensors for use by an occupant-sensing system.

BACKGROUND ART

Presently, when one or more air bags are provided in an automobile, the air bag may be stored in a steering wheel, in a seat bottom side or seat back side or door panel, or in an instrument panel of the vehicle. During automatic inflation of the air bag, at least a portion of the air bag cover moves away from the air bag container to permit the air bag to perform its safety function between its container and the occupant of the vehicle.

A recent practice in the automotive industry is utilization of all plastic fabricated air bag covers. Conventional air bag covers used in conjunction with occupant restraint systems often include various connection systems for attaching the air bag cover to the air bag container.

The U.S. Pat. No. 5,062,661 to Winget, discloses a rigid plate attached to a substantially rigid remainder of a front panel of an air bag cover to define a hollow compartment which, together, move upon manual actuation of a flexible manually operable diaphragm at the front surface of the front panel. Upon separation from the side panel, the front panel, including the diaphram, the hollow compartment, and a rigid plate move together to permit the inflating air bag to leave the cover. The front panel has a first electrically conductive inner surface for making a circuit path with a corresponding second electrically connected inner surface of the rigid plate.

Presently, sensors are used to determine if a vehicle passenger seat is unoccupied or if it has a child car seat disposed thereon for preventing deployment of a passenger air bag if either of these conditions is sensed. For example, U.S. Pat. No. 5,118,134 discloses an air bag controlling sensor arrangement for determining seat occupancy and position of a seat occupant, sensors preferably being mounted in the dash.

U.S. Pat. Nos. 5,071,160; 5,232,243; 5,366,241; 5,398,185; and 5,400,487 all disclose passenger seat detecting and position determining sensors for controlling passive restraint systems in vehicles such as air bags.

U.S. Pat. No. 4,834,420 discloses an air bag equipped child car seat.

SUMMARY OF THE INVENTION

An object of the present invention is to provide an air bag cover having an occupant-sensing sensor module incorporated therein to generate a signal for use by an occupant-sensing system to prevent the air bag from being deployed.

In carrying out the above object and other objects of the present invention, a plastic air bag cover is provided having an integrated sensor module adapted for use in a vehicle occupant-sensing system. The cover includes a front panel adapted to overlie an undeployed air bag. The front panel has a front outer surface and a rear inner surface. The front panel has a window associated therewith which is capable of transmitting a first signal therethrough. The cover also includes an occupant-sensing sensor module including a base plate and sensor means mounted on the base plate. Finally, the cover includes the back plate secured to the rear inner surface of the front panel in containing relationship to the sensor module and forming a hollow compartment for the sensor module. The first signal is transmitted through the window and is received by the sensor means wherein the sensor means generates a second signal for use by the occupant-sensing system to prevent the air bag from being deployed.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 6 is a rear perspective exploded view of the air bag cover of FIG. 2 and illustrating a first mechanism for securing a light source and sensor module at the rear inner surface of a front panel of the cover;

FIG. 7 is a view similar to FIG. 6 illustrating a second mechanism for securing the light source and sensor module at the rear inner surface of the front panel; and FIG. 8 is a view, partially broken away and in cross-section, of the light source and sensor module secured at the rear inner surface of the front panel.

BEST MODE FOR CARRYING OUT THE INVENTION

Figure 1:
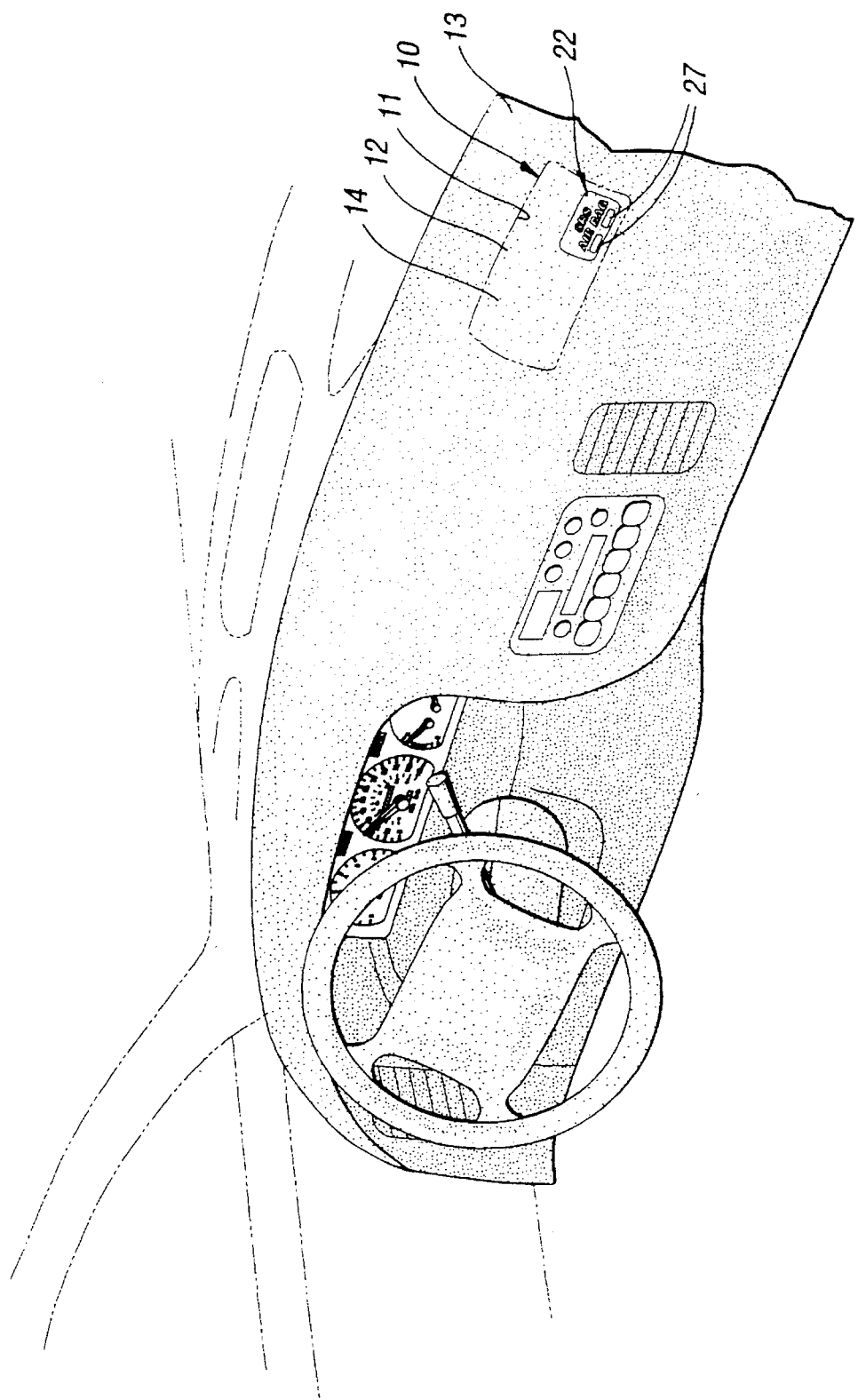
FIG. 1 is an environmental perspective view illustrating an air bag cover constructed in accordance with the present invention.

Referring now to the drawing Figures, there is illustrated in FIGS. 1–8 different embodiments of an automotive air bag cover or door constructed in accordance with the present invention. In the embodiments of FIGS. 1–8, each automotive air bag cover is adapted to be secured within an opening 11 of an instrument panel 13 of a motor vehicle as illustrated in FIG. 1.

Each of the air bag covers is preferably a relatively flexible thermoplastic air bag cover formed by injection molding with a thermoplastic such as Santoprene® (a trademark of Monsanto Co.)

Figure 3:
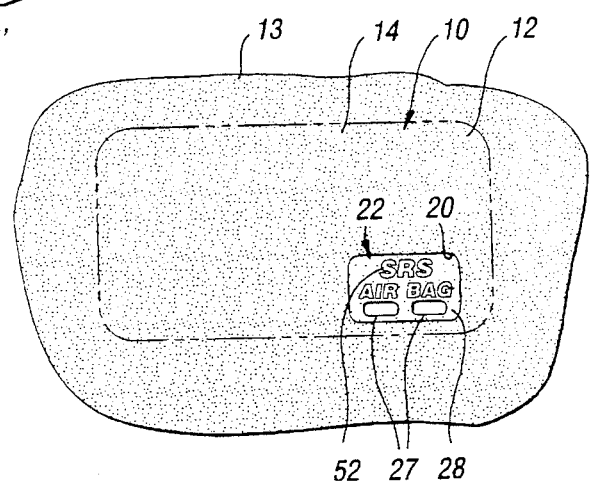
FIG. 3 is a view similar to FIG. 2 illustrating the air bag cover of FIG. 1.

Referring now to FIGS. 1 and 3, one embodiment of an air bag cover, generally indicated at 10, includes a front panel 12 overlying an undeployed air bag (not shown). The front panel 12 has a front outer surface 14 and a rear inner surface (now shown). The front panel 12 may be separable along a prescribed tear pattern a portion of which is shown in FIG. 8 at 18' upon deployment of the air bag. The front panel 12 also has a rectangular window 20 extending completely therethrough between the front outer surface 14 and the rear inner surface at a corner portion of the front panel 12.

The cover 10 also includes a unitary light source and sensor module, generally indicated at 22, which lies behind the rear inner surface of the front panel 12 in the same fashion as module 22' (FIG. 6) and module 22"" (FIG. 7) lie behind their respective rear inner surfaces 16' and 16"" of the front panels 12' and 12"", respectively.

It is to be understood that the same or similar parts of the different embodiments have the same reference numeral but have a different prime designation to distinguish between the different embodiment.

The modules 22' and 22"" are adapted to be electrically coupled to an electrical supply system of a motor vehicle. The unitary module 22' may comprise a rigid insulative material such as an injection molded plastic base plate 25' with a light source 23' comprising an emissive or flat panel display or the like embedded in the base plate 25' such as by insert molding. The emissive display may comprise an electroluminescent display such as a thin film electroluminescent display, an LED, a photoluminescent display, or a plasma display. The flat panel display may be an electroluminescent display such as a thin film electroluminescent display, a plasma display or a non-emissive display such as a liquid crystal display or an optical fiber.

The module 22' also includes at least one sensor 27' mounted on the base plate 25'. The sensor 27' may be any of a variety of known miniature sensors to sense when a passenger is not occupying the front passenger seat or when it is not desirable to have the passenger side air bag deploy such as when an infant is seated in a child seat thereat. The sensor 27' may comprise an ultrasonic sensor, an electromagnetic sensor, an optical sensor, an infrared sensor, or the like.

The module 22' also includes a front plate 28' secured to the base plate 25' wherein at least a portion of the front plate 28' allows light to be transmitted therethrough. The front plate 28' is aligned with and extends through the window 20' above the front outer surface 14' of the front panel 12'. The base plate 25' and the front plate 28' form a sealed hollow compartment for the light source 23' and the at least one sensor 27'. The front plate 28' may be a Mylar® or semi-clear plastic lens.

Figure 2:
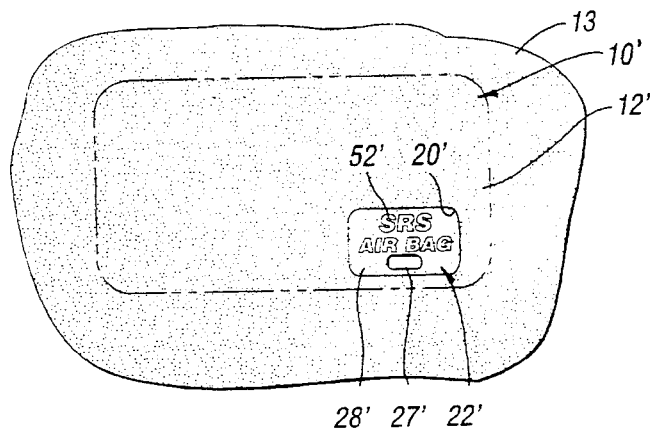
FIG. 2 is a partially broken away front elevation view of one embodiment of the air bag cover.
Figure 4:
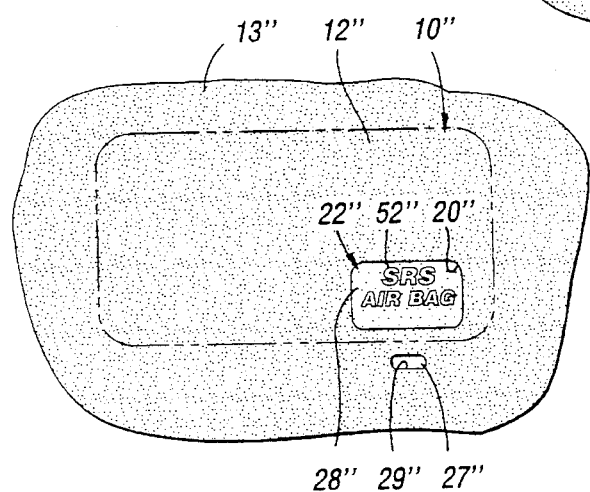
FIG. 4 is another view similar to FIG. 2 illustrating a third embodiment of the air bag cover.
Figure 5:
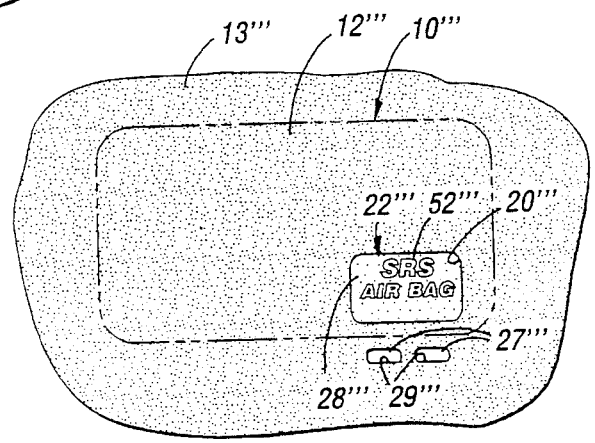
FIG. 5 is yet another view similar to FIG. 2 illustrating a fourth embodiment of the air bag cover.

As illustrated in FIGS. 1, 3 and 5, instead of a single sensor, a sensor pair 27 and 27''' are provided wherein one of the sensor pairs acts as the transmitter and the other of the sensor pairs acts as a receiver. Alternatively, only a single sensor such as illustrated in FIGS. 2, 4 and 7 at 27', and 27" and 27"", respectively, is utilized wherein the single sensor acts as a transceiver (i.e., acts not only as a transmitter but also as a receiver).

Referring now specifically to FIGS. 6 and 7, there are illustrated first and second embodiments of back plates, generally indicated at 32' and 32"", respectively. Each of the back plates 32' or 32"" is secured to the inner surface 16' or 16"" of its front panel 12' or 12"" in containing relationship to their respective unitary modules 22' or 22"" to form hollow compartments for their unitary modules 22' or 22"".

With specific reference to FIG. 6, the back panel 32' is secured by a C-shaped locking rim, generally indicated at 33', integrally formed at the rear inner surface 16' of the front panel 12' about the window 20'. The locking rim 33' includes a locking groove 35' in which the back plate 32' is snap fit.

With specific reference to FIG. 7, the back panel 32"" includes a plurality of apertures 36"" formed therethrough for receiving retaining stakes 38"" integrally formed and rearwardly extending at the rear inner surface 16"" of the front panel 12"".

As illustrated in FIGS. 4 and 5, a single aperture 29" or aperture pair 29''' may be formed through the instrument panel 13" or 13''', respectively, so that the sensor 27" or sensor pair 27''' may be located immediately adjacent the hole in the instrument panel 13" or 13''' in which the air bag cover 10" or 10''' is visible.

As illustrated in FIGS. 1 through 5 with respect to the embodiments of the air bag covers 10 through 10''' illustrated therein, each of the front plates 28 through 28''' may include visually perceptible transparent or translucent indicia 52 through 52''' to identify that its respective air bag cover covers a supplemental restraint system (SRS) such as an inflatable air bag.

Light from its light source 23' and 23"" is transmitted through the indicia 52' to form an information-bearing image within the passenger compartment to convey its safety information to the passengers of the vehicle. Alternatively, each of the light source 23' and 23"" generates the light pattern which forms the message and the front plates 28 through 28"" are substantially transparent or translucent.

The air bag front panel is an excellent location for a sensor module that, in effect, controls the deployment of an air bag stored behind such a panel. The cover incorporates the sensor module that automatically determines if the front panel should separate from the rest of the air bag cover at the time of frontal impact. It can otherwise be costly to re-design the vehicle interior to allow for other sensor locations. Integration of such a sensor into existing air bag cover designs is therefore highly desirable.

While the best mode for carrying out the invention has been described in detail, those familiar with the art to which this invention relates will recognize various alternative designs and embodiments for practicing the invention as defined by the following claims.

What is claimed is:

1. A plastic air bag door having an integrated sensor module adapted for use in a vehicle occupant-sensing system, the door comprising:

a front panel adapted to overlie an undeployed air bag disposed in a passenger side of the vehicle, the front panel having a front outer surface and a rear inner surface, the front panel having a window associated therewith capable of transmitting a first signal therethrough;

an occupant-sensing sensor module including a base plate and sensor means mounted on the base plate; and a back plate secured to the rear inner surface of the front panel in containing relationship to the sensor module and forming a hollow compartment for the sensor module wherein the first signal is transmitted through the window and received by the sensor means, the sensor means generating a second signal for use by the occupant-sensing system to prevent the air bag from being deployed.

2. The air bag door as claimed in claim 1 wherein the sensor means is an ultrasonic sensor means and wherein the first signal is a reflected ultrasonic wave, the window permitting the reflected ultrasonic wave to pass therethrough and be received by the ultrasonic sensor means.

3. The air bag door as claimed in claim 2 wherein the ultrasonic sensor means includes a transmitter for transmitting an ultrasonic wave through the window and a receiver for receiving the reflected ultrasonic wave.

4. The air bag door as claimed in claim 1 wherein the sensor means is an electromagnetic sensor means which sets up an electromagnetic field in a passenger compartment of the vehicle, the window allowing the electromagnetic field to be set up therethrough.

5. The air bag door as claimed in claim 1 wherein the sensor means is an optical sensor means and wherein the first signal is a reflected optical signal, the window allowing the reflected optical signal to pass therethrough and be received by the optical sensor means.

6. The air bag door as claimed in claim 5 wherein the optical sensor means is an infrared optical sensor.

7. The air bag door as claimed in claim 5 wherein the optical sensor means includes a light-emitting transmitter for transmitting an optical signal through the window and a receiver for receiving the reflected optical signal.

8. The air bag door as claimed in claim 1 wherein the sensor means includes a transmitter and a receiver.

9. The air bag door as claimed in claim 1 wherein the sensor means is a transceiver.

* * * * *